United States Patent [19]

Stewart et al.

[11] Patent Number: 4,933,539

[45] Date of Patent: Jun. 12, 1990

[54] GRAPHIC SCANNING AIDS FOR A LASER SCANNER

[75] Inventors: Brian S. Stewart, San Francisco; Eleanor J. Fulton, Berkley, both of Calif.; Nicolas N. Tabet, Eugene, Oreg.

[73] Assignee: Spectra-Physics, San Jose, Calif.

[21] Appl. No.: 142,083

[22] Filed: Jan. 11, 1988

[51] Int. Cl.⁵ .............................................. G06K 7/10
[52] U.S. Cl. ..................................... 235/470; 235/462
[58] Field of Search ......................... 235/467, 470, 462

[56] References Cited

U.S. PATENT DOCUMENTS

| | | | |
|---|---|---|---|
| 4,652,732 | 3/1987 | Nickl | 235/470 X |
| 4,713,532 | 12/1987 | Knowles | 235/467 |
| 4,789,775 | 12/1988 | McClain et al. | 235/470 |

Primary Examiner—David L. Trafton
Attorney, Agent, or Firm—Killworth, Gottman, Hagan & Schaeff

[57] ABSTRACT

A method and apparatus for use with a laser scanner which projects a laser light beam in a scan pattern to facilitate finding a label on a package and reading the symbols thereon. The apparatus comprises a window, positioned adjacent the laser scanner which has an illuminating portion through which the scan pattern is transmitted and a background portion through which the scan pattern is not transmitted. The apparatus also comprises graphic means, adjacent a first part of the background portion of the window, for delineating a target area towards which the package should be directed by an operator to ensure that the label is properly oriented within the scan pattern for the laser light beam to acurately illuminate and read the symbols on the label. The apparatus may also comprise mask means, superposed on a second part of the background portion of the window, for substantially obstructing the laser scanner from the view of the operator.

29 Claims, 5 Drawing Sheets

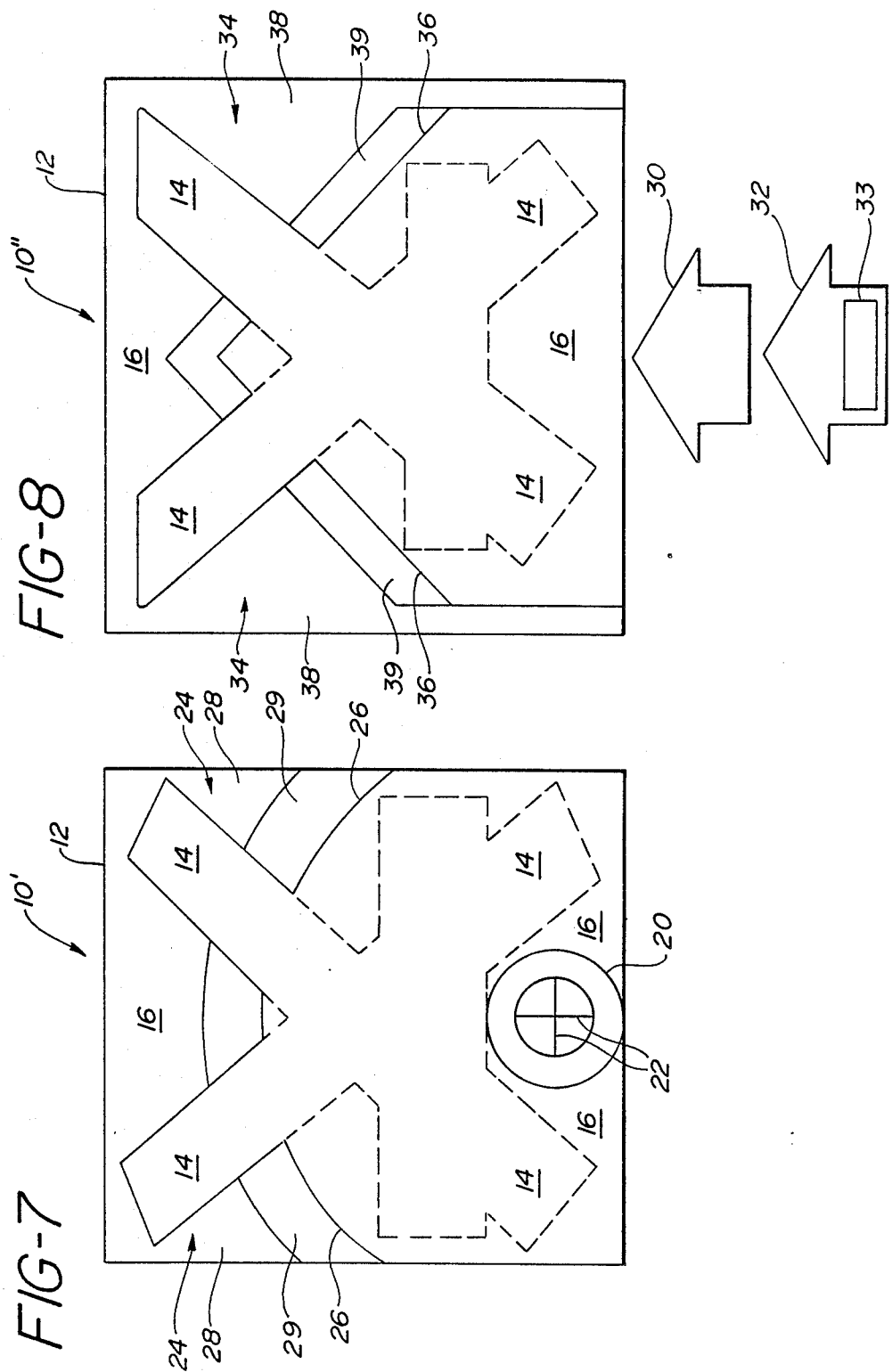

GRAPHIC SCANNING AIDS FOR A LASER SCANNER

BACKGROUND OF THE INVENTION

The present invention relates generally to laser instruments and, more particularly, to a method and apparatus for use with a laser scanner which projects a laser light beam in a scan pattern to facilitate finding a label on a package and reading the symbols on the label.

A wide variety of laser scanners have been designed to read bar code labels used on a broad range of retail packages for check-out and inventory purposes at the point of sale ("POS") for grocery stores and other high volume transaction businesses. One such laser scanner provided by the assignee of the present invention and disclosed in another patent application assigned to the assignee, U.S. Ser. No. 64,317 filed June 18, 1987, comprises an optical arrangement to project a laser light beam in a three-dimensional scan pattern through a window mounted flush with the surface of a counter top. The scan pattern is capable of finding and reading labels in as many orientations as possible. The basic requirement for using laser scanners at the point of sale is that the store check-out clerk, whether experienced or inexperienced, should not have to worry about the orientation of the label as the package is passed through the scan pattern.

When the window of the laser scanner is positioned vertically, the clerk must direct the package upwardly toward the window so that the scanner can read the label. It has been discovered that there is a very strong tendency for the clerk to check packages by passing the label horizontally across the window which prevents laser scanner from reading the label because it is not properly oriented in the scan pattern. Additionally the clerk has a more direct view of the inside of a vertically positioned scanner compared to a horizontal scanner since the clerk faces the window. As a result, the clerk is often distracted by the visible internal parts of the scanner. If the label is not properly oriented because of these problems, the clerk must repeat the scanning process as many times as necessary for the scanner to successfully read the label. As a result, the throughput time required to enter each product code into the POS terminal increases and, ultimately, the clerk becomes frustrated and reverts to hand-keying the product codes into the POS terminal which is unacceptable in such business environments.

Accordingly, there is a need to counteract the very strong tendency of the clerk to check packages by passing a bar code label horizontally past the window of the laser scanner and to further counteract the visual impact of the distraction of the clerk caused by the visible internal parts of the scanner.

SUMMARY OF THE INVENTION

The present invention provides a method and apparatus for use with a laser scanner, which projects a laser light beam in a scan pattern to find a label on a package and read symbols thereon, that satisfies the aforementioned needs. Such apparatus comprises a window, positioned adjacent the laser scanner and having an illuminating portion through which the scan pattern is transmitted and a background portion through which the scan pattern is not transmitted. The apparatus also comprises graphic means, adjacent a first part of the background portion of the window, for delineating a target area toward which the package should be directed by an operator to insure that the label is properly oriented within the scan pattern for the laser light beam to accurately illuminate and read the symbols on the label.

When the scan pattern is configured as a cross bar X, the graphic means is substantially annular and superposed on the first part of the background portion of the window immediately below the illuminating portion of the window in a first embodiment according to the present invention. Such apparatus may further comprise mask means, superposed on a second part of the background portion of the window for substantially obstructing the view of the operator of the upper portion of the laser scanner from the top of the window down to a semi-circular border substantially concentric with the graphic means. The mask means is a color sufficiently dull for preventing distraction of the operator from the graphic means. The graphic means, however, is a color sufficiently bright for attracting the attention of the operator to the target area.

When the scan pattern is configured as a cross bar X, the graphic means comprises at least one arrow-shaped figure positioned adjacent the periphery of the first part of the background portion of the window below the illuminating portion of the window in a second embodiment according to the present invention. The arrow-shaped figure points upwardly toward the center of the illuminating portion of the window. Such apparatus may further comprise mask means, superposed on a second part of the background portion of the window, for substantially obstructing the view of the operator of the upper portion of the laser scanner from the top of the window down to an inverted V-shaped border, the vertex of which points in the same direction as the arrow-shaped figure. The mask means is a color sufficiently dull for preventing distraction of the operator from the graphic means and the arrow-shaped figure is a color sufficiently bright for attracting the attention of the operator to the target area.

The present invention also meets these needs by providing a method of using the laser scanner which projects the laser light beam in a scan pattern to find a label on the package and read symbols thereon. The method comprises the steps of positioning a window adjacent the laser scanner, transmitting the laser light beam in a scan pattern through an illuminating portion of the window, no laser light beam being transmitted through the remaining background portion of the window, and moving the package by means of an operator toward a target adjacent first part of the background portion of the window to ensure that the label is properly oriented within the scan pattern for the laser light beam to accurately illuminate and read the symbols on the label.

When the scan pattern is configured as a cross bar X, a first form of the method according to the present invention may further comprise the steps of forming the target as an annular-shaped figure and superposing the annular-shaped target on the background portion of the window immediately below the illuminating portion of the window. Such method may further comprise the step of superimposing a mask on a second part of the background portion of the window for substantially obstructing the view of the operator of the upper portion of the laser scanner from the top of the window down to a semi-circular border substantially concentric with the annular-shaped target. When the scan pattern is configured as a cross bar X. a second form of the method according to the present invention may comprise the steps of forming the target as an arrow-shaped figure and positioning the arrow-shaped target adjacent the periphery of the background of the window below the illuminating portion of the window pointing upwardly toward the center of the illuminating portion of the window. Such method may further comprise the step of superposing a mask on a second part of the background portion of the window for substantially obstructing the view of the operator of the upper portion of the laser scanner from the top of the window down to an inverted V-shaped border, the vertex of which points in the same direction as the arrow-shaped target.

Accordingly, it is an object of the present invention to provide a method and apparatus for use with the laser scanner to facilitate finding a label on a package and reading the symbols thereon; to counteract the very strong tendency of the clerk to check packages by passing the bar code label horizontally past the window of the laser scanner; to counteract the visual impact of the distractions of the clerk caused by the visible internal parts of the laser scanner; and, ultimately, to reduce the throughput time required to enter each product code into the POS terminal. Other objects and advantages of the invention will be apparent from the following description, the accompanying drawings and the appended claims.

BRIEF DESCRIPTION OF THE DRAWINGS

FIG. 7 is a schematic side view of a first embodiment of a window showing an annular target on the background portion of the window according to the present invention; and FIG. 8 is a schematic side view of a second embodiment of a window showing a V-shaped target on the background portion of the window according to the present invention.

DETAILED DESCRIPTION OF THE PREFERRED EMBODIMENT

Figure 1:
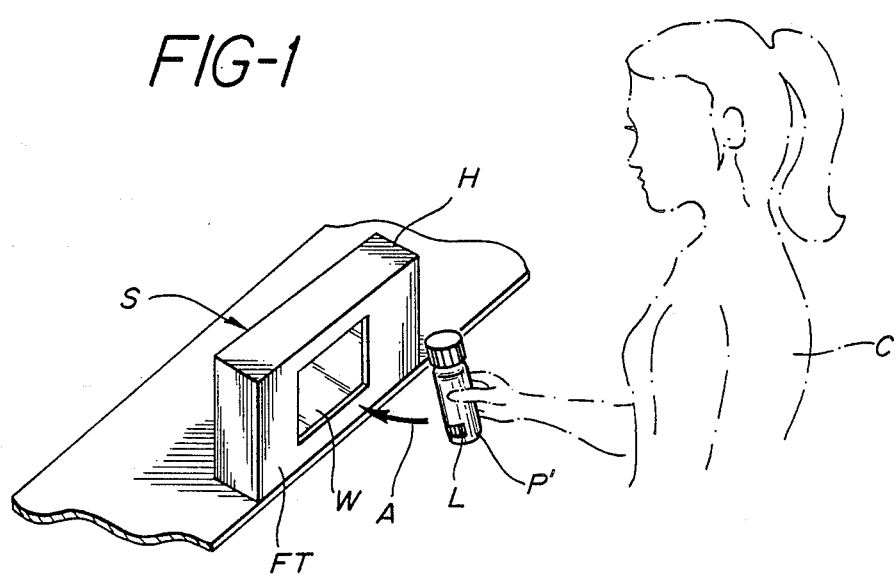
FIG. 1 is a pictorial view of a clerk directing a bar code label on a package toward the window of a laser scanner.

FIG. 1 is a pictorial view of a sales clerk or operator C using a laser scanner S at a check-out counter to scan a label L, more particularly a bar code label, on a package or product P'. The laser scanner S comprises a housing H, a window W positioned at the front FT of the scanner S, and an optical system or optical parts (not shown) within the housing H. The structure and operation of the scanner S is described in more detail in the patent application referenced hereinabove. The clerk C manually moves the package P' toward the window W of the scanner S in a direction indicated by an arrow A. The scanner S projects a laser light beam in a scan pattern (not shown) through the window W to find the bar code label L on the package P' and read the symbols thereon. The scanner S causes the laser light beam to rapidly sweep through a series of scan lines which collectively form the scan pattern to read the label L. The scan pattern is formed to achieve a high probability that at least one set of perpendicularly intersecting scan lines will cross a label to provide a successful scan by the laser scanner S.

Figure 2:
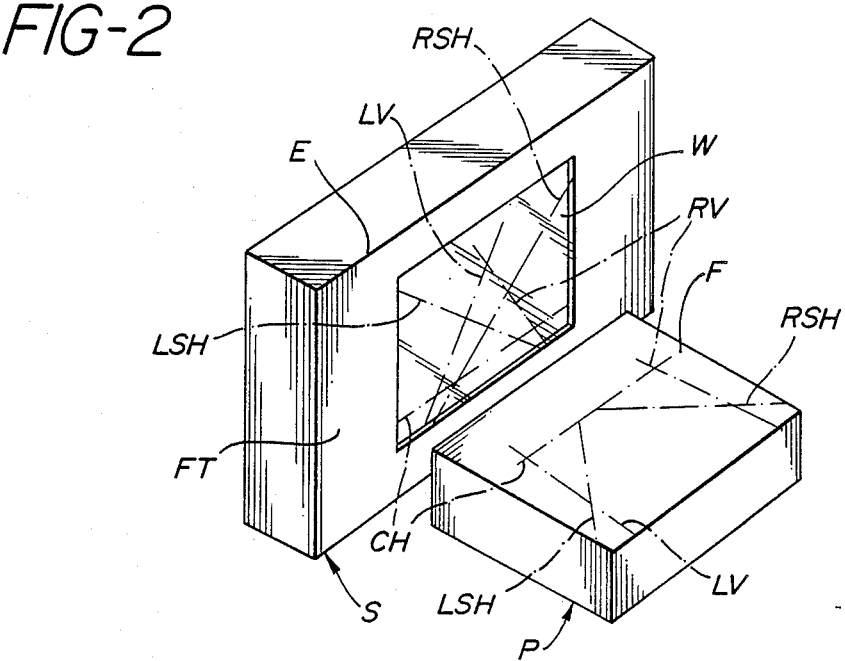
FIG. 2 is a perspective view of the laser scanner and a package disposed horizontally below and normal to the window of the laser scanner wherein a cross bar X scan pattern is projected through the window to the face of the package.

The present invention uses a "cross bar X" scan pattern which is a configuration of scan lines that provides the set of perpendicularly intersecting scan lines for crossing the label L. FIG. 2 illustrates the cross bar X scan pattern on the window W of the scanner S and on a face F of a package P, bearing a bar code label (not shown), disposed in a horizontal position parallel to the top edge E of the scanner S. The cross bar X pattern consists of five basic scan lines: the center horizontal (CH) line, the right and left side horizontal (RSH and LSH) lines and right and left vertical (RV and LV) lines. Note the orthogonality of the RV and LV scan lines with the CH scan line.

Figure 3:
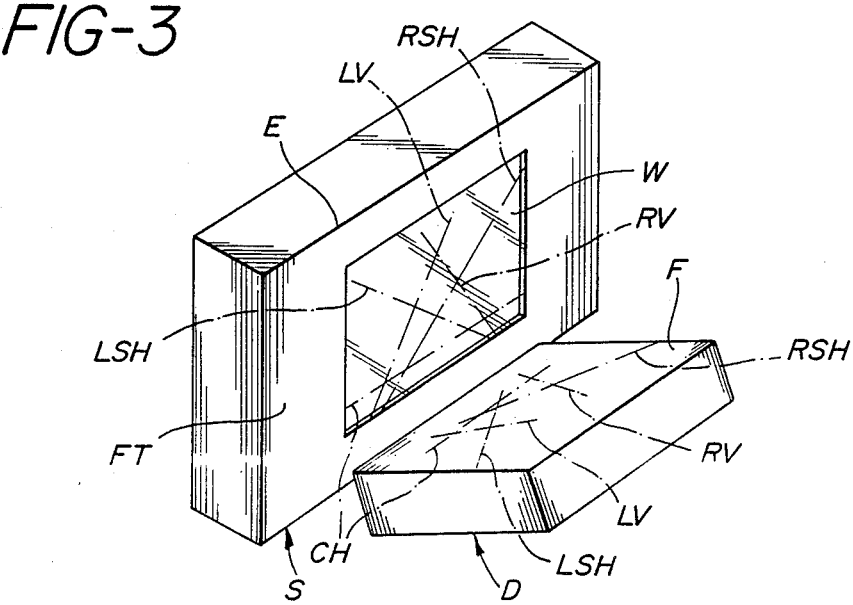
FIGS. 3-5 are perspective views similar to that of FIG. 2 but showing the package at different orientations within the cross bar X scan pattern.
Figure 4:
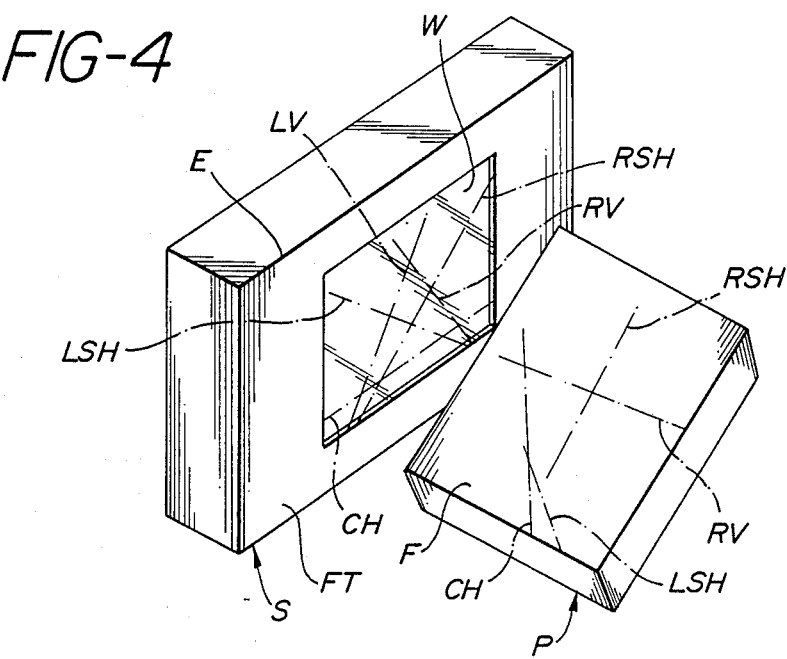
Figure 5:
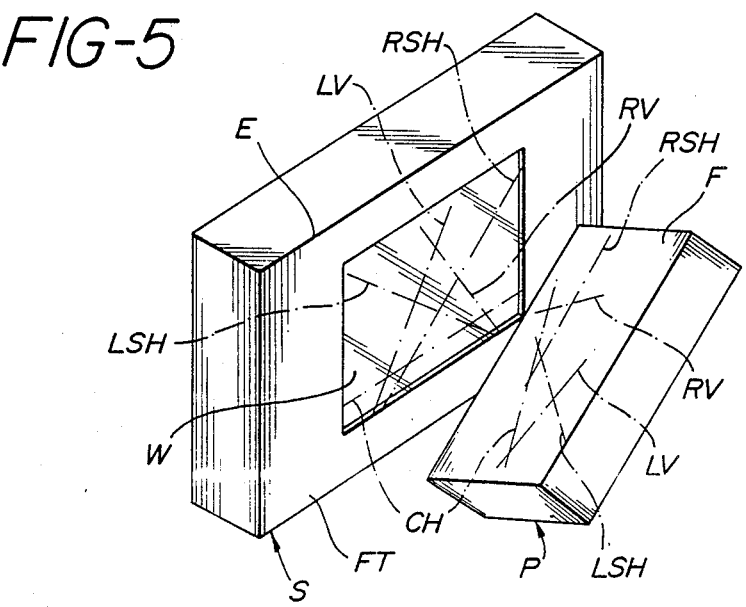

A more intuitive understanding the cross bar X scan pattern can be gained by examining depictions of the scan pattern on the package P in different orientations, as shown in FIGS. 3-5. In FIG. 3, the face F of the package P is disposed parallel to the top edge E of the scanner S and leans forty-five degrees toward the front FT of the scanner S. Note the orthogonality of the LV and LSH scan lines. In FIG. 4, the face F of the package P is disposed in a horizontal position, but rotated forty-five degrees from the top edge E of the scanner S. Note the orthogonality of the RV and RSH scan lines. In FIG. 5, the face F of the package P is rotated forty-five degrees from the top edge E of the scanner S and leans forty-five degrees toward the front FT of the scanner S. Note the orthogonality of the RV and CH scan lines. In each of FIGS. 2-5, there is at least one set of perpendicularly intersecting scan lines even though the labels are oriented at very different locations. The cross bar X scan pattern thus ensures that at least one set of perpendicularly intersecting scan lines will cross a label.

Figure 6:
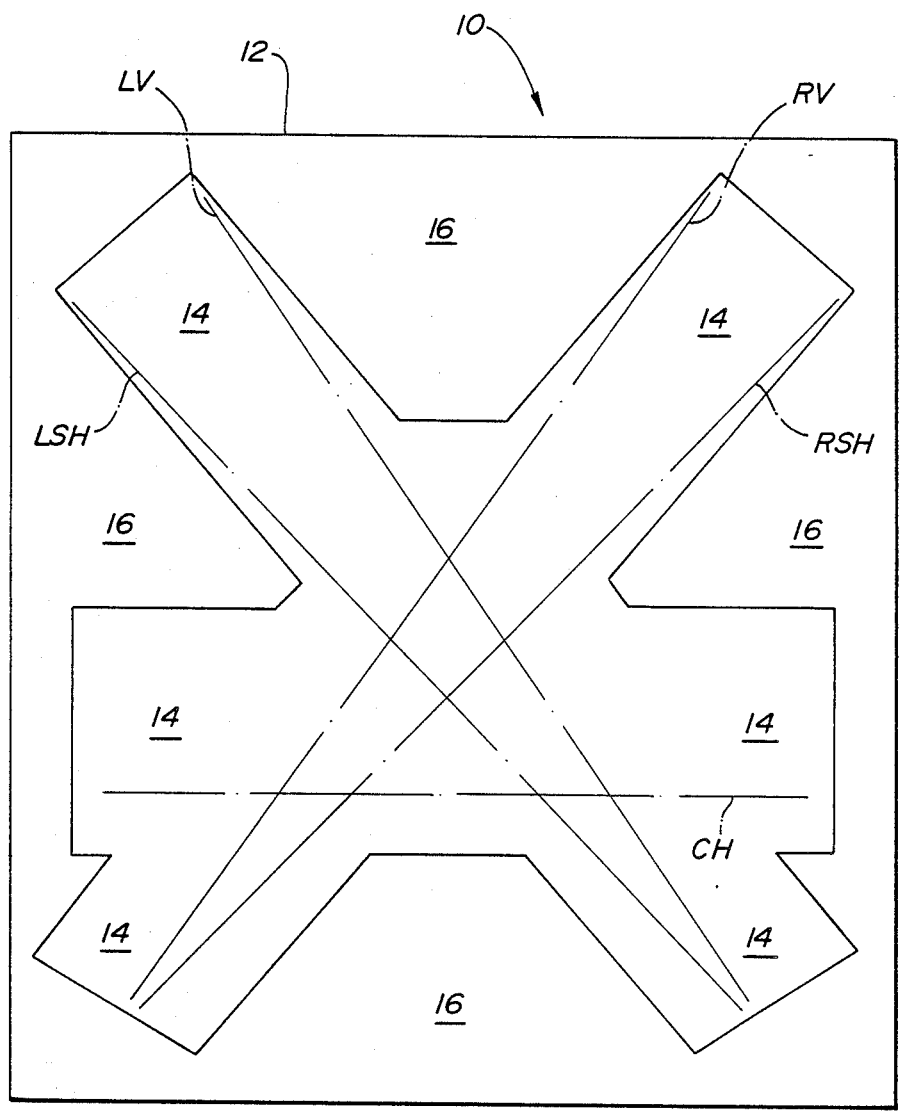
FIG. 6 is a schematic side view of the window of the laser scanner showing an illuminating portion of the window through which the cross bar X scan pattern is projected and a background portion of the window through which the scan pattern is not projected.

The apparatus adapted for use with the laser scanner S which projects a laser light beam in a cross bar X scan pattern is shown generally at 10 in FIG. 6 and is generally referred to as the X-mask embodiment. The apparatus 10 comprises a window 12 which either replaces the original window W of the scanner S or functions as an overlay on the original window W. The window 12 is positioned adjacent the laser scanner S and has an illuminating portion 14 through which the cross bar X scan pattern (scan lines CH, RV, LV, RSH, and LSH) is transmitted and a background portion 16 through which the scan pattern is not transmitted. The general shape of the illuminating portion 14 is that of a cross bar X pattern and the background portion 16 simply represents the remaining transparent portion of the window 12. The center of the illuminating portion 14 of the window is located generally at the intersection of the LSH and RSH scan lines.

The first embodiment of the apparatus according to the instant invention is shown generally at 10' in FIG. 7 and is generally referred to as the target embodiment. The target embodiment 10' comprises the window 12 on which is shown a dashed outline of the illuminating portion 14, the remaining portion being the background portion 16, and a first embodiment 20 of graphic means which is substantially annular in shape. The annular shaped graphic means 20 is superimposed on first part of the background portion 16 of the window 12 for delineating a target area toward which the package P should be directed to ensure that the label L is properly oriented within the scan pattern for the laser light beam to accurately illuminate and read the symbols on the label L. The annular-shaped graphic means 20 is positioned immediately below the illuminating portion 14 of the window 12. The annular-shaped graphic means 20 also comprises and encircles a pair of generally orthogonal cross hairs 22 which further accentuate the direction A and target area toward which the clerk C should move the package P.

The target embodiment 10′ further comprises mask means 24, superposed on a second part of the background portion 16 of the window 12 for substantially obstructing the view of the clerk C of the upper portion of the laser scanner S from the top of the window 12 down to a semi-circular border 26 which is substantially concentric with the annular-shaped graphic means 20. The semi-circular border 26 of the mask means 24 is adjacent the center of the illuminating portion 14 of the window 12. A portion 28 of the mask means 24 is opaque and the remaining portion 29 is a screen. The screen portion 29 can be, for example a set of straight parallel opaque lines, a set of semi-circular concentric opaque lines, or a grid of opaque lines, so long as the mask means 24 sufficiently obstructs the clerk's C view of the inside of the housing H of the scanner S. The shape of the semi-circular border 26 of the mask means 24 accentuates the shape of the annular-shaped graphic means 20 and the screen portion 29 provides a smooth gradient between the opaque portion 28 of the mask means 24 and the transparent background portion 16 of the window 12 so that the clerk C is not distracted from the annular-shaped graphic means 20.

The second embodiment of the apparatus according to the instant invention is shown generally at 10″ in FIG. 8 and is generally referred to as the arrow embodiment. The arrow embodiment 10″ comprises the window 12 on which is shown a dashed outline to the illuminating portion 14 of the window 12, the remaining portion being the background portion 16, and a second embodiment 30 of the graphic means which comprises at least one arrow-shaped figure.

The arrow-shaped graphic means 30 is positioned adjacent the periphery of the first part of the background portion 16 of the window 12 for delineating a target area towards which the package P should be directed to ensure that the label L is properly oriented within the scan pattern for the laser light beam to accurately illuminate and read the symbol on the label L. The arrow-shaped graphic means 30 is positioned below the illuminating portion 14 and points upwardly toward the center of the illuminating portion 14. The arrow-shaped graphic means 30 may further comprise a second arrow-shaped FIG. 32 positioned below the first arrow-shaped FIG. 30 and having a depiction of a label 33 superposed thereon. The second arrow-shaped FIG. 32 further accentuates the direction A and the target area toward which the clerk C should move the package P.

The arrow embodiment 10″ further comprises mask means 34 superposed on a second part of the background portion 16 of the window 12 for substantially obstructing the view of the clerk C of the upper portion of the laser scanner from the top of the window 12 down to an inverted V-shaped border 36, the vertex of which points in the same direction as the arrow-shaped FIGS. 30, 32. The inverted V-shaped border 36 of the mask means 34 is adjacent the center of the illuminating portion 14. A portion 38 of the mask means 34 is opaque and the remaining portion 39 is a screen. The screen portion 39 can be, for example, a set of straight parallel opaque lines, a set of V-shaped opaque lines or a grid of opaque lines, so long as the mask means 34 sufficiently obstructs the clerk's C view of the inside of the housing H of the scanner S. The shape of the inverted V-shaped border 36 of the mask means 34 further accentuates the shape of the arrow-shaped figures 30, 32 and the screen portion 39 provides a smooth gradient between the opaque portion 38 of the mask means 34 and the transparent background portion 26 of the window 12 so that the clerk C is not distracted from the arrow-shaped FIGS. 30, 32.

The graphic means, the annular-shaped FIG. 20 and the arrow-shaped FIGS. 30, 32 should be a color that is sufficiently bright for attracting the attention of the clerk C It has been found that colors such as, for example, silver, light blue, off-white, and yellow are sufficiently bright to attract the attention of the clerk C. However, specific tests to be described in more detail below, indicate that yellow has a greater capacity to attract attention and is generally associated with the perception that information is being provided as in the sign business. Therefore, the graphic means are yellow in the preferred embodiment. The mask means 24 and 34, however, should be a sufficiently dull color so that the attention of the clerk C is not distracted from the graphic means. Although many colors are available, the mask means are black in the preferred embodiment.

In operation, the method of using the laser scanner S comprises the steps of positioning the window 12 adjacent the laser scanner S, transmitting the laser light beam in a scan pattern through the illuminating portion 14 of the window 12, no laser light beam being transmitted through the remaining background portion 16 of the window 12, and moving the package P by means of the clerk C toward a target adjacent the first part of the background portion 16 of the window 12 to ensure that the label L is properly oriented within the scan pattern for the laser light beam to accurately illuminate and read the symbols on the label L.

When the scan pattern of the laser light beam is a cross bar X, a first form of the method according to the present invention may further comprise the steps of forming the target as an annular-shaped FIG. 20 and superposing the annular-shaped target 20 on the background portion of the window immediately below the illuminating portion 14 of the window 12. Such method may further comprise the step of superposing the mask 24 on the second part of the background portion 16 of the window 12 for substantially obstructing the view of the clerk C of the upper portion of the laser scanner S from the top of the window down to the semi-circular border 26 substantially concentric with the annular-shaped target 20.

When the scan pattern of the laser light beam is a cross bar X, a second form of the method according to the present invention may further comprise the steps of forming the target as the arrow-shaped FIG. 30 and positioning the arrow-shaped target 30 adjacent the periphery of the first part of the background portion of the window below the illuminating portion 14 of the window 12 pointing upwardly toward the center of the illuminating portion of the window. Such a method may also comprise the step of superposing the mask 34 on the second part of the background portion 16 of the window 12 for substantially obstructing the view of the clerk C of the upper portion of the laser scanner S from the top of the window down to an inverted V-shaped border 36, the vertex of which points in the same direction as the arrow-shaped target 30.

The different embodiments of the apparatus, the X-mask embodiment 10, the target embodiment 10', and the arrow embodiment 10", and a fourth "pictogram" embodiment, not shown, were subjected to statistical testing using the laser scanners, Model No. 100-R provided by the assignee of the present invention. The arrow embodiment 10" was tested with the scanner S positioned vertically and with the top edge E of the scanner tilted back. The critical portion of the test is related to the "normal operation" of the scanner S in which only one scanner S was used to test 10 clerks on an individual basis. All of the clerks were female and had various degrees of experience with scanners, but none having experience with the Model 100-R. Under normal operating conditions, the scanner S provides visible and audible feedback signals to indicate that the scanner S had successfully read the label. Each clerk was tested using each embodiment by checking a series of six items or packages five times. The purpose of the test was to determine whether the target, arrow or pictogram embodiments offered an improvement in throughput time over the X-mask embodiment which was used as the control variable. The clerks were then interviewed about their reactions to each embodiment and were asked specifically to rank each embodiment according to the amount of help that each embodiment had given them to obtain good reads.

Table A shows the mean throughput times per package for each of the ten clerks and each embodiment, along with the standard deviations and T-test results.

TABLE A

| Embodiment | N | Means | Standard Deviations | T-test (T/P) |
|---|---|---|---|---|
| X-Mask (control) | 10 | 475.7 | 240.2 | — |
| Arrows (tilted) | 10 | 341.6 | 78.1 | 1.795/0.11 |
| Arrows (vertical) | 10 | 326.4 | 52.9 | 2.135/0.06 |
| Annular Target | 10 | 298.8 | 56.1 | 2.544/0.03 |
| Pictogram | 10 | 380.2 | 245.5 | 0.956/0.36 |

All of the embodiments of the graphic means show an improvement over the X-mask embodiment: the arrow embodiment (vertical) by 32%, the arrow embodiment (tilted) by 29%, the target embodiment by 38%, and the pictogram embodiment by 21%. However, related sample T-tests indicated that the only statistically significant result was for the target embodiment: T =2.544, P of 0.03.

The subjective ratings of the clerks for help given by each of the embodiments of the graphic means are shown in Table B, where the ranking for help given by an embodiment ranges from the number 1, indicating the least help, to the number 5 indicating the most help.

TABLE B

| | | Embodiments | | | |
|---|---|---|---|---|---|
| Clerk | X-Mark (Control) | Arrows (tilted) | Arrows (vertical) | Annular Target | Pictogram |
| 1 | 1 | 3 | 3 | 5 | 3 |
| 2 | 1 | 3 | 5 | 4 | 2 |
| 3 | 1 | 5 | 4 | 3 | 2 |
| 4 | 1 | 4 | 5 | 2 | 3 |
| 5 | 2 | 4 | 5 | 1 | 3 |
| 6 | 1 | 3.5 | 3.5 | 5 | 2 |
| 7 | 1 | 4 | 5 | 2 | 3 |
| 8 | 2 | 4 | 3 | 5 | 1 |
| 9 | 1 | 3 | 2 | 4.5 | 4.5 |
| 10 | 5 | 2.5 | 2.5 | 4 | 1 |
| Total: | 16 | 36 | 38 | 35.5 | 24.5 |
| Mean: | 1.6 | 3.6 | 3.8 | 3.6 | 2.5 |

Generally, the clerks felt that the arrow (whether tilted or vertical) and target embodiments were the most helpful and the pictogram embodiment was considered to be the least helpful. Considering these tests, both the arrow and target embodiments were found to be effective. The pictogram embodiment was found to be much less effective, several clerks commenting that they found it to be confusing. The target embodiment produced the most significant improvement over the control X-mask condition. The clerks also indicated that the scanner performed well and specifically stated that it was greatly superior as modified in its ability to give good readings and the speed with which it could be used.

Having described the invention in detail by way of reference to preferred embodiments thereof, it will be apparent that other modifications and variations are possible without departing from the scope of the invention defined in the appended claims. For example, the laser scanner S could also be positioned horizontally to be flush with the top of a counter and the present invention oriented with respect to the scanner S.

What is claimed is:

1. Apparatus, adapted for use with a laser scanner which projects a laser light beam in a scan pattern to find a label on a package and read symbols thereon, comprising:
   a window, positioned adjacent the laser scanner, having an illuminating portion through which the scan pattern is transmitted and a background portion through which the scan pattern is not transmitted:
   graphic means, adjacent a first part of the background portion of said window, for delineating a target area towards which the package should be directed by an operator to ensure that the label is properly oriented within the scan pattern for the laser light beam to accurately illuminate and read the symbols on the label; and
   mask means, superposed on a second part of the background portion of said window, for substantially obstructing the laser scanner from the view of the operator.

2. Apparatus as recited in claim 1, wherein said graphic means is a color sufficiently bright for attracting the attention of the operator to the target area.

3. Apparatus as recited in claim 2, wherein the color of said graphic means is yellow.

4. Apparatus as recited in claim 1, wherein said mask means is a color sufficiently dull for preventing distraction of the operator from said graphic means.

5. Apparatus as recited in claim 4, wherein the color of said mask means is black.

6. Apparatus as recited in claim 1, wherein the scan pattern of the laser light beam is a cross bar X causing the illuminating portion to have a similar shape and wherein said graphic means is substantially circular and superposed on the first part of the background portion of said window immediately below the illuminating portion of said window.

7. Apparatus as recited in claim 1, wherein the scan pattern of the laser light beam is a cross bar X causing the illuminating portion to have a similar shape and wherein said graphic means is substantially annular and superposed on the first part of the background portion of said window immediately below the illuminating portion of said window.

8. Apparatus as recited in claim 7, wherein said graphic means further comprises a pair of generally orthogonal cross hairs.

9. Apparatus as recited in claim 7, in which said mask means is superposed on a second part of the background portion of said window and substantially obstructs the view of the operator of the upper portion of the laser scanner from the top of said window down to a semi-circular border which is substantially concentric with said graphic means.

10. Apparatus as recited in claim 9, wherein the semi-circular border of said mask means is adjacent the center of the illuminating portion of said window.

11. Apparatus as recited in claim 9, wherein said mask means is a color sufficiently dull for preventing distraction of the operator from said graphic means.

12. Apparatus as recited in claim 11, wherein the color of said mask means is black.

13. Apparatus as recited in claim 9, wherein a portion of said mask means is opaque and the remaining portion is a screen.

14. Apparatus as recited in claim 1, wherein the scan pattern of the laser light beam is a cross bar X causing the illuminating portion to have a similar shape and wherein said graphic means comprises at least one arrow-shaped figure positioned adjacent the periphery of the first part of the background portion of said window below the illuminating portion of said window and pointing upwardly toward the center of the illuminating portion of said window.

15. Apparatus as recited in claim 14, wherein said graphic means comprises a second arrow-shaped figure positioned below and pointing in the same direction as the first arrow-shaped figure.

16. Apparatus as recited in claim 15, wherein a depiction of a label is superposed on the second arrow-shaped figure.

17. Apparatus as recited in claim 14, further in which said mask means is superposed on a second part of the background portion of said window and substantially obstructs the view of the operator of the upper portion of the laser scanner from the top of the said window down to an inverted V-shaped border, the vertex of which points in the same direction as the arrow-shaped figure.

18. Apparatus as recited in claim 17, wherein the inverted V-shaped border of said mask means is adjacent the center of the illuminating portion of said window.

19. Apparatus as recited in claim 17, wherein said mask means is a color sufficiently dull for preventing distraction of the operator from said target means.

20. Apparatus as recited in claim 19, wherein the color of said mask means is black.

21. A method of using a laser scanner which projects a laser light beam in a scan pattern to find a label on a package and read symbols thereon, comprising the steps of:

positioning a window adjacent the laser scanner;

transmitting the laser light beam in a scan pattern through an illuminating portion of the window, no laser light beam being transmitted through the remaining background portion of the window;

moving the package by means of an operator toward a target adjacent a first part of the background portion of the window to ensure that the label is properly oriented within the scan pattern for the laser light beam to accurately illuminate and read the symbols on the label; and superposing a mask on a second part of the background portion of the window for substantially obstructing the laser scanner from the view of the operator.

22. A method as recited in claim 21, wherein the scan pattern of the laser light beam is a cross bar X and further comprising the steps of forming the target as an annular-shaped figure and superposing the annular-shaped target on the background portion of the window immediately below the illuminating portion of the window.

23. A method as recited in claim 22, which said step of superimposing a mask comprises the step of superposing a mask on a second part of the background portion of the window for substantially obstructing the view of the operator of the upper portion of the laser scanner from the top of the window down to a semi-circular border substantially concentric with the annular-shaped target.

24. A method as recited in claim 23, further comprising the step of positioning the semi-circular border of the mask adjacent the center of the illuminating portion of the window.

25. A method as recited in claim 21, wherein the scan pattern of the laser light beam is a cross bar X and further comprising the steps of forming the target as an arrow-shaped figure and positioning the arrow-shaped target adjacent the periphery of the first part of the background portion of the window below the illuminating portion of the window pointing upwardly toward the center of the illuminating portion of the window.

26. A method as recited in claim 25, in which said step of superimposing a mask comprises the step of superposing a mask on a second part of the background portion of the window for substantially obstructing the view of the operator of the upper portion of the laser scanner from the top of the window down to an inverted V-shaped border, the vertex of which points in the same direction as the arrow-shaped target.

27. A method as recited in claim 26, further comprising the step of positioning the inverted V-shaped border of the mask adjacent the center of the illuminating portion of the window.

28. Apparatus as recited in claim 1 in which said window is substantially vertically oriented.

29. A method as recited in claim 21 in which said step of positioning a window includes the step of positioning a window adjacent the laser scanner generally in a vertical orientation.

* * * * *